US008730086B2

(12) United States Patent
Mills

(10) Patent No.: US 8,730,086 B2
(45) Date of Patent: May 20, 2014

(54) WEATHER DETECTION USING SATELLITE COMMUNICATION SIGNALS

(75) Inventor: Raymond L. Mills, Calhan, CO (US)

(73) Assignee: ViaSat, Inc., Carlsbad, CA (US)

( * ) Notice: Subject to any disclaimer, the term of this patent is extended or adjusted under 35 U.S.C. 154(b) by 1309 days.

(21) Appl. No.: 12/544,121

(22) Filed: Aug. 19, 2009

(65) Prior Publication Data

US 2010/0052919 A1 Mar. 4, 2010

Related U.S. Application Data

(60) Provisional application No. 61/091,984, filed on Aug. 26, 2008.

(51) Int. Cl.
  *G01W 1/10* (2006.01)
  *G01S 13/95* (2006.01)
  *G08B 21/00* (2006.01)

(52) U.S. Cl.
  USPC .......................................... 342/26 A; 340/602

(58) Field of Classification Search
  USPC ....................................... 342/26 A
  See application file for complete search history.

(56) References Cited

U.S. PATENT DOCUMENTS

| 4,041,397 | A | 8/1977 | Bauer et al. |
| 4,287,598 | A | 9/1981 | Langseth et al. |
| 4,858,229 | A | 8/1989 | Rosen et al. |
| 4,896,369 | A * | 1/1990 | Adams et al. ............. 455/13.4 |
| 4,910,792 | A | 3/1990 | Takahata et al. |
| 5,465,410 | A | 11/1995 | Hiben et al. |
| 5,550,550 | A | 8/1996 | Das |
| 5,839,050 | A | 11/1998 | Baehr et al. |
| 5,987,233 | A | 11/1999 | Humphrey |
| 5,991,306 | A | 11/1999 | Burns et al. |
| 5,991,622 | A | 11/1999 | Henry, Jr. |
| 6,047,171 | A | 4/2000 | Khayrallah et al. |
| 6,169,513 | B1 | 1/2001 | Cohen |
| 6,434,609 | B1 | 8/2002 | Humphrey |

(Continued)

FOREIGN PATENT DOCUMENTS

| EP | 0 837 569 | 4/1998 |
| GB | 1 223 163 | 2/1971 |

(Continued)

OTHER PUBLICATIONS

Data Over Cable Service Interface Specifications (DOCSIS 3.0): Physical Layer Specification, May 22, 2008. Available from www.cablemodem.com. Downloaded on Oct. 9, 2008. Cable Television Laboratories, Inc. Copyright 2006-2008. CM-SP-PHYv3.0-107-080522.

(Continued)

*Primary Examiner* — Matthew M Barker
(74) *Attorney, Agent, or Firm* — Holland & Hart LLP

(57) ABSTRACT

Disclosed is a satellite weather detection system that uses atmospheric precipitation density data. Subscribers detect the signal strength and signal-to-noise ratio of signals that are transmitted from the satellite. Upstream transmit power data is also collected, which is needed to achieve a given SNR at a gateway. The values of the downstream signal strength and signal-to-noise ratio data as well as the upstream transmit power data are normalized and compared with current atmospheric data. The data can be color coded and graphically displayed to show weather patterns. Location and velocity of high precipitation density cells can be tracked to predict movement of storms.

26 Claims, 5 Drawing Sheets

(56) References Cited

U.S. PATENT DOCUMENTS

| | | | |
|---|---|---|---|
| 6,442,598 | B1 | 8/2002 | Wright et al. |
| 6,546,488 | B2 | 4/2003 | Dillon et al. |
| 6,601,090 | B1 | 7/2003 | Gurijala et al. |
| 6,618,751 | B1 | 9/2003 | Challenger et al. |
| 6,658,463 | B1 | 12/2003 | Dillon et al. |
| 6,678,791 | B1 | 1/2004 | Jacobs et al. |
| 6,763,006 | B1 | 7/2004 | Lockett |
| 6,947,440 | B2 | 9/2005 | Chatterjee et al. |
| 7,039,683 | B1 | 5/2006 | Tran et al. |
| 7,289,062 | B2 | 10/2007 | Hudson et al. |
| 7,359,395 | B2 | 4/2008 | Toporek et al. |
| 7,516,236 | B2 | 4/2009 | Walsh et al. |
| 7,532,860 | B2 * | 5/2009 | Loner ............... 455/12.1 |
| 7,728,759 | B2 * | 6/2010 | Tillotson et al. ............ 342/26 A |
| 2001/0052015 | A1 | 12/2001 | Lin et al. |
| 2002/0006116 | A1 | 1/2002 | Burkhart |
| 2002/0073167 | A1 | 6/2002 | Powell et al. |
| 2002/0143984 | A1 | 10/2002 | Hudson Michel |
| 2004/0224633 | A1 | 11/2004 | Coromina et al. |
| 2007/0037512 | A1 | 2/2007 | Godwin |
| 2008/0056176 | A1 | 3/2008 | Hudson et al. |
| 2008/0056189 | A1 | 3/2008 | Hudson et al. |

FOREIGN PATENT DOCUMENTS

| | | | | |
|---|---|---|---|---|
| JP | 04132993 | A | * 5/1992 | ............ G01W 1/14 |
| JP | 04204193 | A | * 7/1992 | ............ H01W 1/14 |
| WO | EP 0762637 | | 3/1997 | |
| WO | WO 99/18678 | | 4/1999 | |
| WO | WO 99/63711 | | 12/1999 | |
| WO | WO 00/46682 | | 8/2000 | |
| WO | WO 2004/002016 | | 12/2003 | |
| WO | WO 2005/067367 | | 7/2005 | |
| WO | WO 2008/027974 | | 3/2008 | |

OTHER PUBLICATIONS

Digital Video Broadcasting (DVB);Second generation framing structure, channel coding and modulation systems for Broadcasting, Interactive Services, News Gathering and other broadband satellite applications, (draft ETSI EN 302 307) version 1.1.1, Jun. 2004. Available from www.etsi.org. Downloaded on Oct. 9, 2008.

"Digital Video Broadcasting (DVB); Second Generation Framing Structure, Channel coding and Modulation Systems for Broadcasting, Interactive Services, News Gathering and other Broadband Satellite Applications", (ETSI EN 302 307) version 1.1.2, Jun. 2006. Available from www.etsi.org. Downloaded on Oct. 9, 2008.

U.S. Appl. No. 11/847,064, filed Aug. 29, 2007.
U.S. Appl. No. 11/847,102, filed Aug. 29, 2007.
U.S. Appl. No. 11/847,084, filed Aug. 29, 2007.
U.S. Appl. No. 11/847,121, filed Aug. 29, 2007.
Patent Abstracts of Japan; vol. 012, No. 461 (E-689), Dec. 5, 1988, and JP 63 185129 A (NEC Corp), Jul. 30, 1988 (see abstract).
U.S. Appl. No. 61/091,984, filed Aug. 26, 2008.
U.S. Appl. No. 12/544,130, filed Aug. 19, 2009.
U.S. Appl. No. 61/095,979, filed Sep. 11, 2008.
U.S. Appl. No. 11/847,006, filed Aug. 29, 2007.
U.S. Appl. No. 61/100,206, filed Sep. 25, 2008.
U.S. Appl. No. 60/840,809, filed Aug. 29, 2006.
U.S. Appl. No. 12/265,618, filed Nov. 5, 2008.
Patent Abstracts of Japan; vol. 012, No. 452 (E-687), Nov. 28, 1988, and JP 63 179629 A (Nippon Telegr & Teleph Corp), Jul. 23, 1988 (see abstract).
ISA/EP, International Search Report and the Written Opinion of the International Searching Authority dated Jul. 22, 2008, Int'l Patent App. No. PCT/US07/77124, 18 pgs.

* cited by examiner

WEATHER DETECTION USING SATELLITE COMMUNICATION SIGNALS

CROSS REFERENCE TO RELATED APPLICATIONS

The present application is based upon and claims the benefit of U.S. provisional application Ser. No. 61/091,984, filed Aug. 26, 2008, by Raymond L. Mills, entitled "Weather Detection Using Satellite Communication Signals." The entire content of this application is hereby specifically incorporated herein by reference for all it discloses and teaches.

BACKGROUND OF THE INVENTION

Satellite technology has been used for a number of years for communication purposes. For example, satellites have been used to transmit television signals, Internet data, telephone signals, navigational signals and other data. Satellites have the advantage of being able to transmit communication data to the most remote parts of the world without topographical interference.

SUMMARY OF THE INVENTION

An embodiment of the present invention may therefore comprise a method of detecting atmospheric precipitation density using signal-to-noise ratio data relating to the signal-to-noise ratio of subscriber received signals transmitted from a satellite to subscribers at subscriber locations comprising: receiving the subscriber received signals at the subscriber locations; generating the signal-to-noise ratio data relating to the signal-to-noise ratio of the subscriber received signals; transmitting the signal-to-noise ratio data from the subscribers to a central office; normalizing the signal-to-noise ratio data by averaging the signal-to-noise ratio data over a plurality of time periods to produce averaged signal-to-noise ratio data; comparing the signal-to-noise ratio data for a current time period with the averaged signal-to-noise ratio data to generate differential signal-to-noise ratio data that is representative of atmospheric precipitation density.

An embodiment of the present invention may further comprise a method of detecting atmospheric precipitation density using signal strength data relating to the signal strength of subscriber received signals transmitted from a satellite to subscribers at subscriber locations comprising: receiving the subscriber received signals at the subscriber locations; generating the signal strength data relating to the signal strength of the subscriber received signals; transmitting the signal strength data from the subscribers to a central office; normalizing the signal strength data by averaging the signal strength data over a plurality of time periods to produce averaged signal strength data; comparing the signal strength data for a current time period with the averaged signal strength data to generate differential signal strength ratio data that is representative of atmospheric precipitation density.

An embodiment of the present invention may further comprise a system for detecting atmospheric precipitation density using signal-to-noise ratio data relating to the signal-to-noise ratio of downstream signals transmitted from a satellite to subscribers at known subscriber locations comprising: a subscriber transceiver that receives the downstream signal and transmits an upstream signal; a subscriber modem that receives the downstream signals from the transceiver, determines the signal-to-noise ratio data of the downstream signal and encodes the upstream signal with the signal-to-noise ratio data; a control system that receives the upstream signal, extracts the signal-to-noise ratio data from the upstream signal and has a processor that normalizes the signal-to-noise ration data by averaging the signal-to-noise ratio data over a plurality of time periods to produce averaged signal-to-noise ration data, compares the signal-to-noise ration data for a current time period with the averaged signal-to-noise ration data to generate differential signal-to-noise ratio data that is representative of atmospheric precipitation density.

An embodiment of the present invention may further comprise a system for detecting atmospheric precipitation density using signal strength data relating to the signal strength of downstream signals transmitted from a satellite to subscribers at known subscriber locations comprising: a subscriber transceiver that receives the downstream signal and transmits an upstream signal; a subscriber modem that receives the downstream signals from the transceiver, determines the signal strength data of the downstream signal and encodes the upstream signal with the signal strength data; a control system that receives the upstream signal, extracts the signal strength data from the upstream signal and has a processor that normalizes the signal strength data by averaging the signal strength data over a plurality of time periods to produce averaged signal strength data, compares the signal strength data for a current time period with the averaged signal strength data to generate differential signal strength data that is representative of atmospheric precipitation density.

DETAILED DESCRIPTION OF THE EMBODIMENTS

Figure 1A:
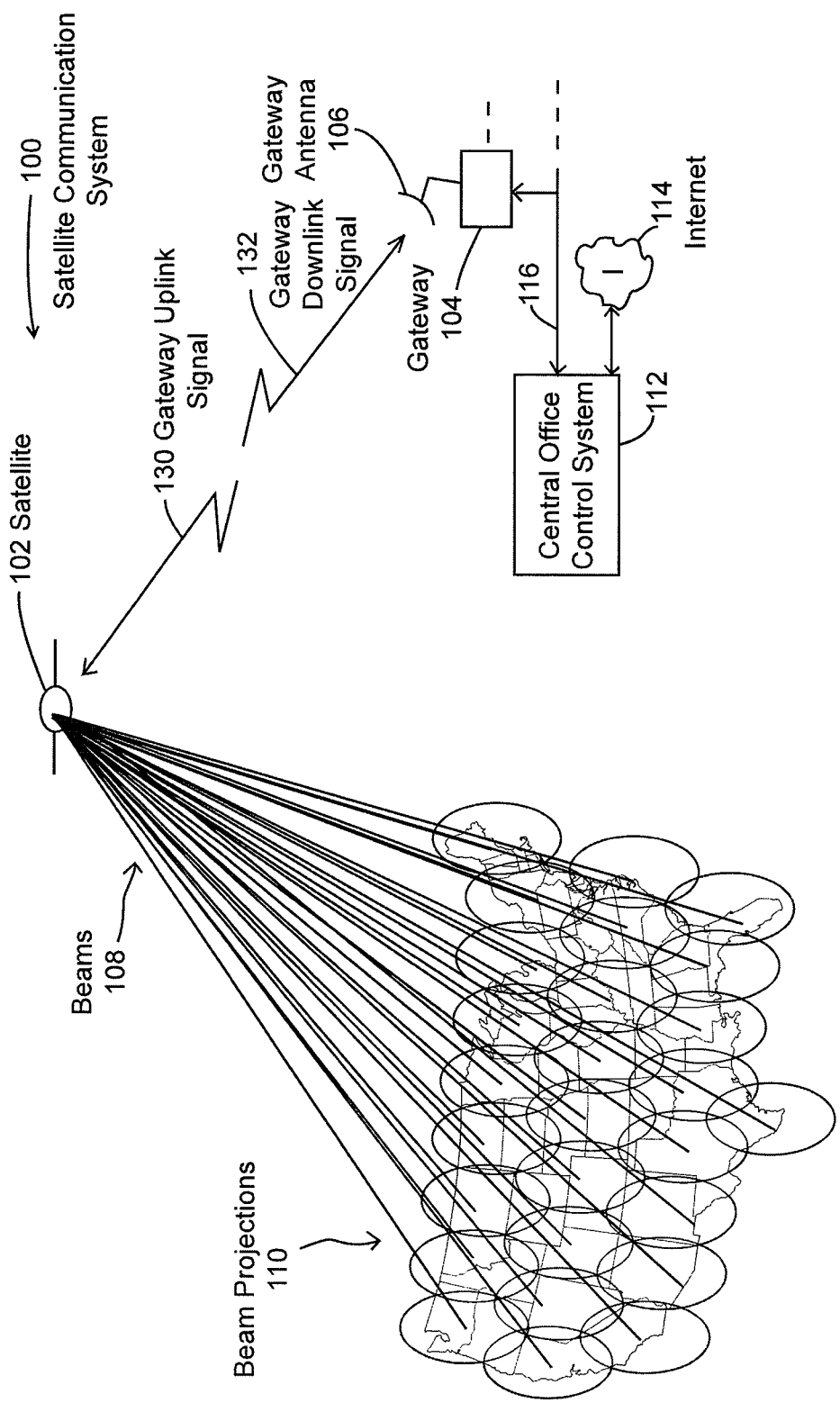
FIG. 1A is a schematic representation of an embodiment of a satellite communication system.

FIG. 1A is a schematic illustration of one embodiment of a satellite communication system. The satellite communication system is a bidirectional system, such as that used by Wild Blue Communications Inc., located at 5970 Greenwood Plaza Blvd., Suite 300, Greenwood Village, Colo. 80111, that delivers and receives Internet data. In accordance with the system illustrated in FIG. 1, satellite 102 has a series of antennas that project beams 108 over the USA and receive signals from subscribers located within the beam projections 110 which cover most of the area of the USA. The antennas on the satellite 102 are mounted on several different antenna arrays (pallets). Some systems allow individual adjustment of antennas. The antenna arrays mounted on the satellite 102 both send and receive data so that data can be transmitted downstream to subscribers on the ground and transmitters disposed at the subscriber location can transmit data upstream to the satellite 102.

Gateway 104, illustrated in FIG. 1A, uses antenna 106 to transmit gateway uplink signals 130 to the satellite 102 via the gateway antenna 106. The gateway uplink signal is referred to as a downstream signal since it is sent downstream from the central office control system to the subscriber. Similarly, gateway 104 receives gateway downlink signals 132 from satellite 102, which is an upstream signal. As indicated in FIG. 1A, there may be more than one gateway that transmits and receives data to and from satellite 102. For example, the embodiment illustrated in FIG. 1A may have 11 gateways at 7 different locations. A high speed, wideband ground connection 116 is provided between the central office control system 112 and the gateways, such as gateway 104. Central office control system 112 operates and controls the satellite communication system 100, illustrated in FIG. 1A, and is connected to the Internet 114.

Figure 1B:
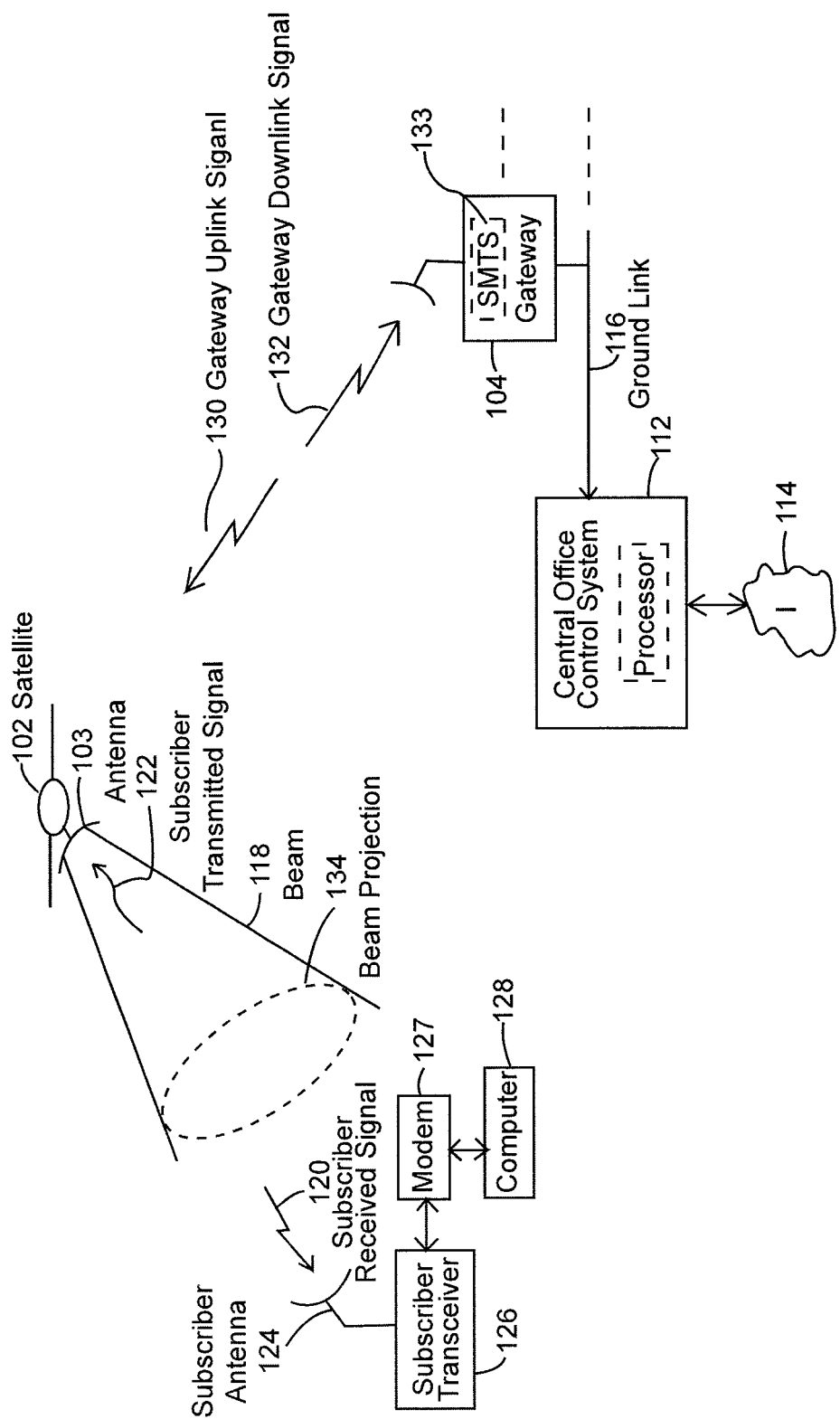
FIG. 1B is a schematic representation of the satellite communication system of FIG. 1A illustrating a single subscriber.

FIG. 1B illustrates a single beam 118, of the plurality of beams 108 (FIG. 1A), and a single subscriber located within the beam projection 134 of beam 118. The subscriber has a subscriber antenna 124 that is connected to a subscriber transceiver 126, which is connected to modem 127. Modem 127 is connected, in turn, to the subscriber computer 128. Transceiver 126 receives and transmits signals via subscriber antenna 124. Modem 127 processes data and controls the operation of transceiver 126. The subscriber computer 128 transmits and receives signals to and from modem 127. Transceiver 126 transmits the subscriber transmitted signal 122 (upstream signal) to the satellite 102 at 30 GHz. Similarly, transceiver 126 receives the subscriber received signal 120 (downstream signal) from the satellite 102 at 20 GHz. Beam 118 creates a beam projection 134 on the surface of the earth as a result of the focused antenna 103, which is one of a number of focused antennas mounted on the satellite 102 that create beam 108 and beam projections 110 (FIG. 1A), including beam projection 134. Antenna 103 is capable of transmitting the subscriber received signal 120 from the satellite 102 and receiving the subscriber transmitted signal 122.

The satellite 102 also includes antennas (not shown) that are directed specifically at the gateways. For example, a separate antenna on satellite 102 is used to transmit the gateway downlink signal 132 to gateway 104 and receive the gateway uplink signal 130 from gateway 104. The gateway 104 includes a satellite modem termination system 133 that obtains data from the subscriber modem 127 every two seconds. The satellite modem termination system, that is disposed in the gateways, provides data on a periodic basis, such as at 15-minute increments, to the central office control system 112 where the data is processed by a processor 112. Process 112 may comprise a bank of high speed computers that are programmed to perform the various processing functions disclosed herein. This data includes the signal power of the subscriber received signal 120 at the subscriber transceiver 126, which is referred to as the downstream power data, as well as the signal-to-noise ratio of the subscriber received signal 120, which is referred to as the downstream SNR data.

Since the subscriber received signal 120 is transmitted at 20 GHz, precipitation density in the atmosphere will cause the subscriber received signal 120 to be attenuated. Atmospheric precipitation density will also lower the signal-to-noise ratio of the subscriber received signal. Hence, the downstream power data and the downstream SNR data, that is derived from the subscriber received signal 120, provide information relating to atmospheric precipitation density. For example, if a severe thunderstorm is located between the subscriber antenna 124 and antenna 103 on satellite 102, the downstream power data and the downstream SNR data will indicate the level of precipitation density. In operation, when the transceiver 126 receives the subscriber received signal 120 via the subscriber antenna 124, the modem 127 determines the signal strength and signal-to-noise ratio of the subscriber received signal 120 and generates the downstream power data and downstream SNR data which the modem 127 encodes in the subscriber transmitted signal 122.

The subscriber transmitted signal 122 is also encoded by modem 127 with data indicating the power at which the subscriber transceiver 126 transmits the subscriber transmitted signal 122. The modem 127 controls the power level at which the transmitter of the subscriber transceiver 126 transmits power. The modem encodes the transmitted power data, which is referred to as the upstream transmit power data, in the subscriber transmitted signal 122 that is transmitted to the satellite 102 and subsequently to the satellite termination modem system 133 in the gateway 104. The satellite modem termination system 133 detects and records this upstream transmission power data and provides the upstream transmission power data to the central office control system 112 on a periodic basis. In operation, the modem 127 sets the transmitter of the subscriber transceiver 126 at a target value. When atmospheric precipitation is encountered by the subscriber transmitted signal 122, the precipitation density tends to attenuate the subscriber transmitted signal 122. In response, the central office control system 112 detects this reduction via satellite modem termination system 133, and transmits a control signal to the modem 127 to increase power output. In this manner, the subscriber transmitted signal 122 is increased to have sufficient power, even though there is precipitation in the atmosphere between the subscriber antenna 124 and the satellite antenna 103. The reduction in power of the upstream transmit power data provides an indication of precipitation density between the subscriber antenna 124 and the satellite antenna 103.

Hence, the three types of data, i.e., the downstream power data, the downstream SNR data, and the upstream transmit power data, which are referred to as atmospheric precipitation density data, provide valuable information regarding the precipitation density in the atmosphere that is encountered by the subscriber received signal 120 and the subscriber transmitted signal 122. The central office control system 112 maintains a record of these three different types of data which the central office control system 112 processes for the purpose of displaying atmospheric precipitation density and weather patterns throughout the USA, as well as other functions.

In systems where interference occurs between adjacent beams, the signal-to-noise ratio data is a more reliable metric for determining atmospheric precipitation density. The signal-to-noise ratio data provides higher resolution than signal strength data because of the interference problems with adjacent beams. Hence, the signal-to-noise ratio data is more accurate than the signal strength data when interference is present. However, in systems that are not affected by interference, signal strength may be a better metric for determining atmospheric precipitation density. Thus, either the signal strength data or signal-to-noise ratio data can be used to determine atmospheric precipitation density. When displaying the atmospheric precipitation density data, a color encoding scheme may be used based upon different levels of the signal-to-noise ratio or signal strength to provide a visual display of the signal-to-noise ratio data or signal strength data from each of the cells 202 illustrated in FIG. 2.

Figure 2:
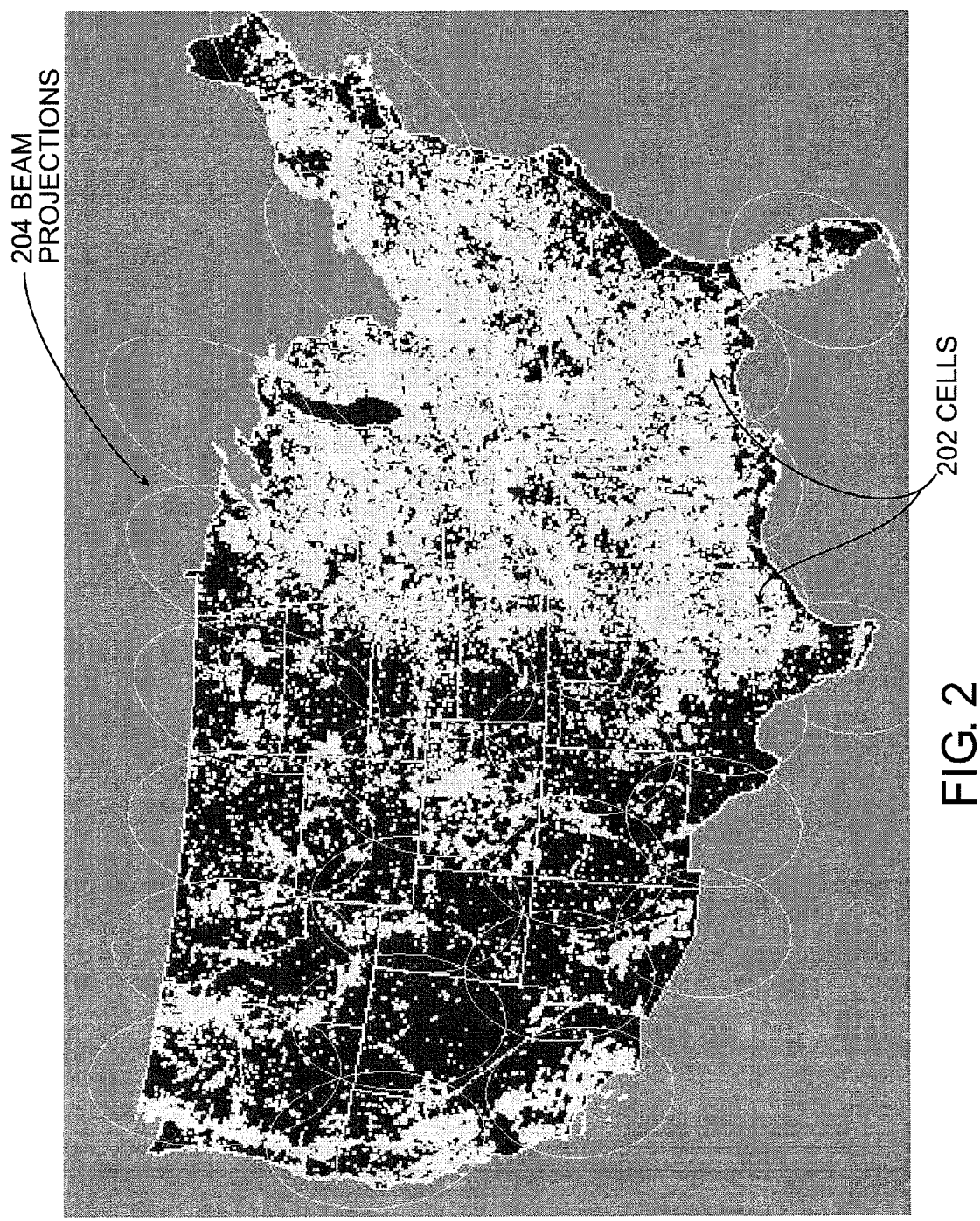
FIG. 2 is a schematic illustration of beam projections and a plurality of cells over the USA.

FIG. 2 illustrates the beam projections 204, as well as active cells of the communication system of FIG. 1A throughout the USA. In many locations, as illustrated in FIG. 2, the cells 202 in the grid of cells that span the USA are populated with at least one subscriber so that many cells provide data to the central office control system 112. The central office control system 112 color codes and displays the data, and may provide additional processing to track the movement of storms. For example, the system operated by Wild Blue Communications, Inc. has over 300,000 subscribers spread throughout the USA. Since the cells 214-252 are color-coded and there are many of these cells that are populated by subscribers, an accurate depiction of the precipitation density and weather can be easily discerned throughout the country from the displayed color-coded data.

A process of normalizing precipitation density data is required as a result of variations in subscriber equipment and roll off of signal power as the distance of the subscriber equipment increases from the beam center of the beam projections. The three forms of atmospheric precipitation density data, i.e., downstream power data, downstream SNR data and upstream transmit power data, are provided by the satellite modem termination system 133 to the central office control system 112 on a periodic basis. The central office control system 112 records each of those forms of data from each cell and averages that data over the previous 12 hour period. The current data is then compared to the average data and the difference is encoded as a color signal which is displayed on a display at the central office control system 112.

Figure 3:
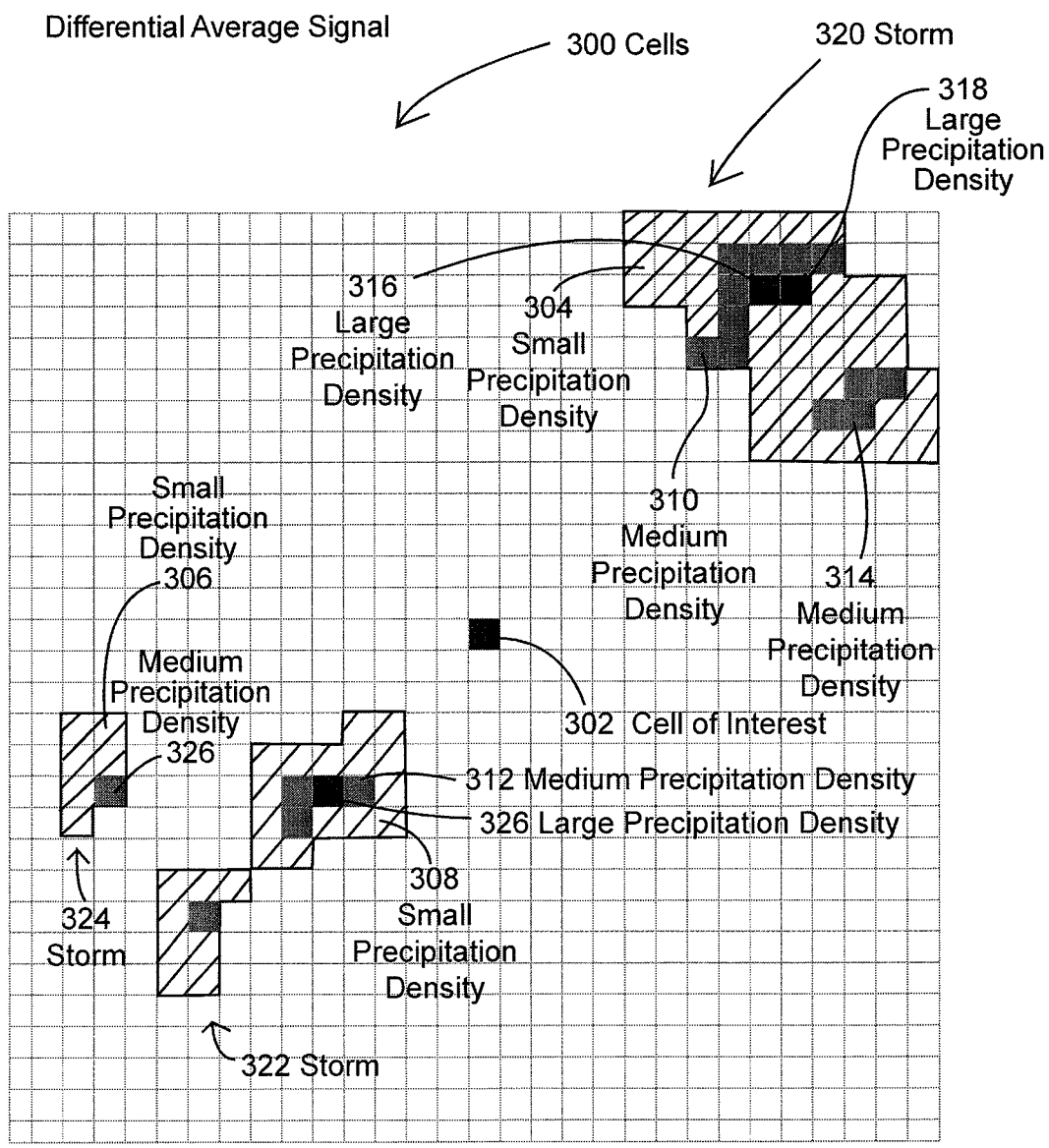
FIG. 3 is a schematic illustration of a subset of a plurality of cells that cover the USA.

FIG. 3 is a schematic illustration of a subset of a plurality of cells 300 that form a grid of cells that cover most of the terrestrial area of the United States, as shown in FIG. 2. Each of the cells 300 spans a tenth of a degree in both latitude and longitude to form the substantially rectangular shape illustrated for each of the cells shown in FIG. 3. Each of the cells 300 may have one or more subscribers located within the boundaries of the cells. The subscribers are individuals or businesses that subscribe to the communication services provided by the communication system illustrated in FIG. 1. The size of the cells 300 is such that, in more populated areas, where there are more subscribers, up to several hundred subscribers may exist in a single cell. In more rural areas, only one or several subscribers may exist in a cell. In some rural areas, there are no subscribers for some cells. Hence, multiple sets of precipitation density data may be collected for some cells, while other cells may produce only one set of data or no data.

FIG. 3 also illustrates the manner in which precipitation density data can be accurately displayed for each cell to illustrate weather patterns. In order to determine the precipitation density for any particular cell of the cells 300 that are illustrated in FIG. 3, the data must be normalized. In other words, the data for each cell must be normalized to some standard in order to provide an accurate depiction of the current precipitation density for each cell. This is achieved by averaging techniques. For example, one method of normalizing the precipitation density data is to average the data for all of the subscribers in a cell for a plurality of successive time periods. In that regard, each of the three forms of precipitation density data, i.e., downstream power data, downstream SNR data, and upstream transmit power data, can be collected at the central office control system 112 at periodic intervals, such as every fifteen minutes. The data from each subscriber in a particular cell is then averaged with the data from other subscribers in that cell for that particular form of data to provide three data average numbers for that particular time period.

More specifically, downstream SNR data is collected at the central control office during a first time period from all of the subscribers in a particular cell. The downstream SNR data for all of the subscribers in that cell during that period is then averaged to provide a downstream SNR data average for that cell for the first time period. This process is also performed for the downstream power data to provide a downstream power data average for the first time period. Similarly, this process is performed for the upstream transmit power data to provide an upstream transmit power data average for each time period for each cell. The three averaged data numbers are stored for each time period and then averaged over a 24 hour period. The current data averages for each of the three different forms of data are then compared with the averages for each of the types of data over the last 24 hours to produce a differential average signal for each of the three different types of precipitation density data.

FIG. 3 also illustrates an example of one embodiment for displaying the differential average data for at least one form of the precipitation density data. For example, FIG. 3 may illustrate the differential average data for the downstream SNR data. In the example shown in FIG. 3, only three levels of differential average data are displayed. Of course, multiple levels of differential average data can be provided with different degrees of shading and/or color to indicate intensity of the atmospheric precipitation density. For example, FIG. 3 shows a number of cells, such as cell 304, having a small precipitation density that outline a storm 320. Included within the outline of the storm 320 are a number of cells, such as cells 310, 314, having medium precipitation density. Storm 320 also includes cells 316, 318 that have a large precipitation density. Cells 316, 318 indicate the most severe portion of the storm 320. Similarly, FIG. 3 illustrates storm 322 that includes numerous cells, such as cell 308, having small precipitation density that form an outline of the storm 322. In addition, storm 322 includes several cells, such as cell 312, that include medium density precipitation. Cell 326 has a large precipitation density. Storm 324 is a smaller storm that has several cells, such as cell 306, with a small precipitation density, and one cell 326 with medium precipitation density.

As also shown in FIG. 3, cell 302 is indicated as a cell of interest. Cell 302 may be a cell in which a gateway is located, such as gateway 104, illustrated in FIGS. 1A and 1B, or cell 302 may be a cell for a particular subscriber. The display illustrated in FIG. 3 is a close view of the cells 202, illustrated in FIG. 2, which illustrates a predetermined number of cells in each direction from the cell of interest 302. The number of cells displayed in each direction from the cell of interest 302 can be modified as desired. If cell 302 constitutes a cell in which a gateway is located, the system operators can determine if atmospheric precipitation density is currently affecting the operation of the gateway by simply viewing the displays, such as the display illustrated in FIG. 3. If it is determined that a gateway is being affected by atmospheric precipitation density, the central office control system may wish to route transmissions through a different gateway via ground link 116 (that is shown in FIGS. 1A and 1B). If the cell of interest 302 is a cell of a particular subscriber, the central office control system can respond to telephone calls from subscribers within cell 302 and indicate that the reason for an interruption in service or a degradation in the service is the result of a storm.

Figure 4:
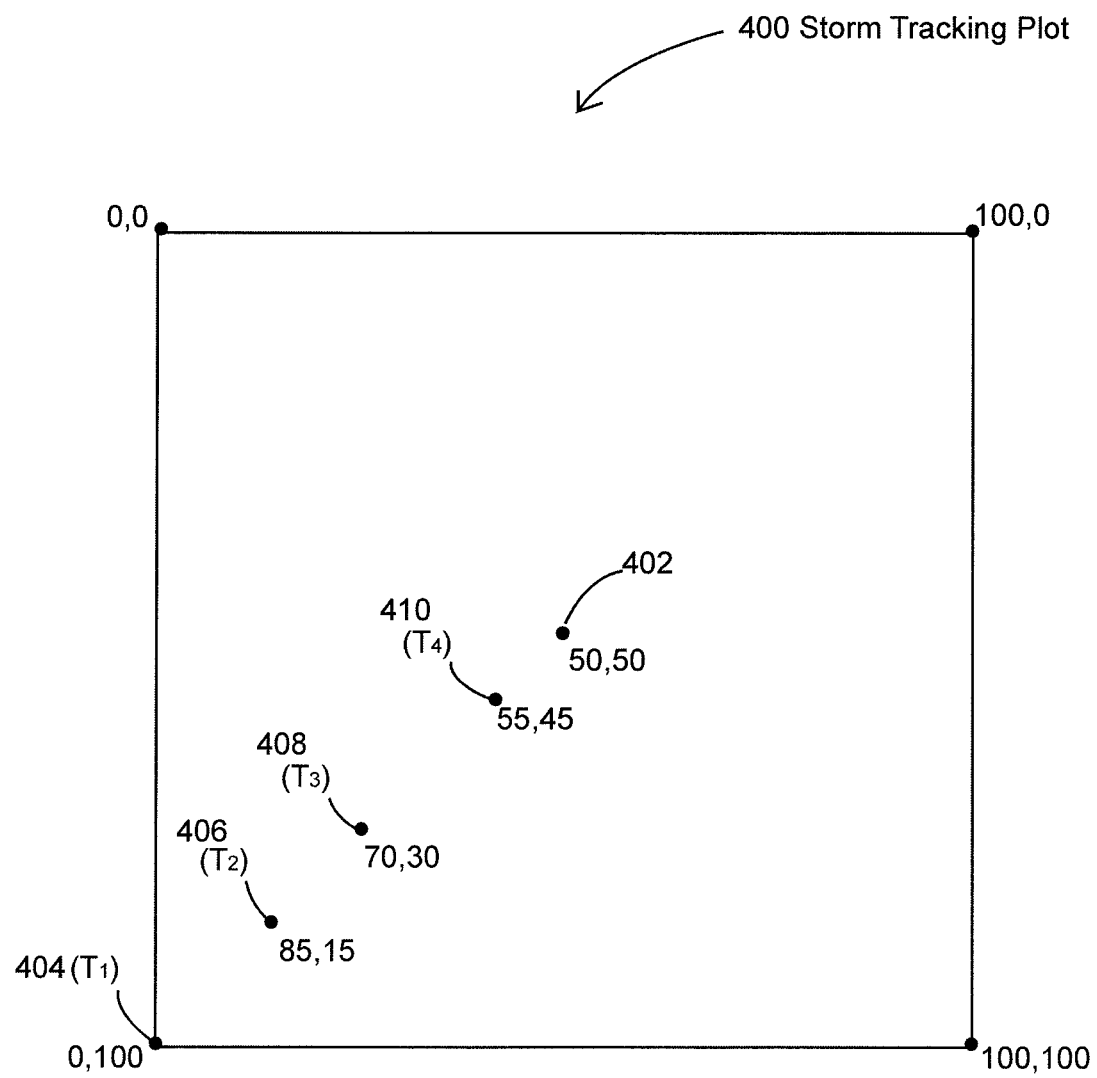
FIG. 4 is a schematic illustration of a storm tracking plot.

FIG. 4 is a plot 400 that plots the movement of a storm to provide storm tracking and prediction of storm movement. Both the location, velocity and direction of the storm can be tracked using this technique. FIG. 4 illustrates a plot 400, similar to FIG. 3, but with 100 cells shown in each direction. The central office control system analyzes the data and determines the closest cell to the cell of interest 402 that has a large precipitation density. For example, cell 316 (FIG. 3) is the closest cell in storm 320 to the cell of interest 302 that has a large precipitation density. Cell 318 also has a large precipitation density, but is farther from cell 302 than cell 316. Hence, cell 316 is the cell that would be recorded for the purposes of storm tracking in FIG. 4. With regard to storm 322, only one cell, i.e., cell 326, has a large precipitation density. Hence, cell 326 would be the cell that is recorded, for the purposes of storm tracking, in plot 400 of FIG. 4. With regard to storm 324, there are no cells that have a large precipitation density. Hence, no cells from storm 324 would be plotted in plot 400 of FIG. 4.

FIG. 4 shows the plot of a storm over four successive time periods. For the storm plotted in FIG. 4, the closest cell to the cell of interest 402, having a large precipitation density, is located at point 404, at position 0, 100, at time T1. At the next time period (T2), the closest cell showing large precipitation density for that storm is located at point 406, at position 85, 15. At the third time period (T3), which is fifteen minutes later than the second time period (T2), the closest cell showing large precipitation density is located at point 408, at position 70, 30. At the fourth time period (T4), the closest cell having large precipitation density is located at point 410, at position 55, 45. From this data, it can be easily calculated that a storm having large precipitation density will be located over the cell of interest 402, at position 50, 50, five minutes after the fourth time period (T4). This is the result of the fact that storms normally track in a linear fashion over short time periods, such as time periods of one hour or less, and smaller distances of several tens of miles. Hence, the tracking and plotting of storms can be performed in an automated fashion and predictions can be made as to when a storm will be located over a particular cell. With this information, the central office control system 112 can send alerts to individual subscribers located in specific cells indicating when the subscribers may lose service, the duration of the loss of service and warn subscribers about severe weather. Computer programs can be provided on the computer system 128 of the subscribers, which can provide an auditory and/or visual alert to subscribers that severe weather will affect their area at a particular time. This time can be accurately predicted for the subscribers in each cell, such as each of the cells illustrated in FIG. 3, so as to provide valuable, potentially lifesaving information.

An additional form of averaging can also used. Since some cells may have more subscribers than other cells, the data from adjacent cells is also averaged. For example, the data from a particular cell may be averaged with the data from the two adjacent cells in each direction to provide additional normalization of the data. This technique provides a degree of edge smoothing of the data and greater normalization.

Hence, the disclosed embodiments provide a system which automatically tracks the position and velocity of storms to be able to predict the movement of storms and provide this information to subscribers. In addition, weather that may affect a gateway, such as gateway 104, can be predicted, so that data can be re-routed to other gateways, if necessary. Three different types of precipitation density data are collected and can be compared to provide more accurate information. Since the downstream signals are transmitted at 20 GHz, and the upstream signals are transmitted at 30 GHz, differences in the attenuation of these signals can be used to provide even more data regarding the amount of attenuation caused by atmospheric precipitation density.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of detecting atmospheric precipitation density using signal-to-noise ratio data relating to the signal-to-noise ratio of subscriber received signals transmitted from a satellite to subscribers at subscriber locations comprising:
   receiving said subscriber received signals at said subscriber locations;
   generating said signal-to-noise ratio data relating to said signal-to-noise ratio of said subscriber received signals;
   transmitting said signal-to-noise ratio data from said subscribers to a central office;
   normalizing, by a processor, said signal-to-noise ratio data by averaging said signal-to-noise ratio data over a plurality of time periods to produce averaged signal-to-noise ratio data;
   comparing, by a processor, said signal-to-noise ratio data for a current time period with said averaged signal-to-noise ratio data to generate differential signal-to-noise ratio data that is representative of atmospheric precipitation density.

2. The method of claim 1 wherein said process of normalizing said signal-to-noise ratio data comprises:
   averaging said signal-to-noise ratio data for the subscribers in a plurality of cells for said plurality of time periods to generate average signal-to-noise ratio values for said plurality of cells for said plurality of time periods;
   averaging said average signal-to-noise ratio values for said plurality of time periods.

3. The method of claim 2 wherein said process of normalizing said data further comprises:
   averaging said average signal-to-noise ratio value for at least one of the plurality of cells with other average signal-to-noise ratio values for adjacent cells.

4. The method of claim 3 further comprising:
   graphically displaying said differential signal-to-noise ratio data to produce a graphical representation of said atmospheric precipitation density.

5. The method of claim 1 further comprising the process of:
   identifying locations of high precipitation density cells during each of said plurality of time periods that have a predetermined precipitation density;
   calculating velocity and direction of movement of a storm based upon said locations of said high precipitation density cells over said plurality of time periods to predict movement and velocity of said storm for time periods that are subsequent to said plurality of time periods.

6. The method of claim 5 wherein said process of identifying locations of high precipitation density cells further comprises:
   identifying a closest cell to a cell of interest of said high precipitation density cells for said storm during each time period of said plurality of time periods.

7. A method of detecting atmospheric precipitation density using signal strength data relating to the signal strength of subscriber received signals transmitted from a satellite to subscribers at subscriber locations comprising:
   receiving said subscriber received signals at said subscriber locations;
   generating said signal strength data relating to said signal strength of said subscriber received signals;
   transmitting said signal strength data from said subscribers to a central office;
   normalizing, by a processor, said signal strength data by averaging said signal strength data over a plurality of time periods to produce averaged signal strength data;
   comparing, by a processor, said signal strength data for a current time period with said averaged signal strength data to generate differential signal strength ratio data that is representative of atmospheric precipitation density.

8. The method of claim 7 wherein said process of normalizing said signal strength data comprises:
averaging said signal strength data for the subscribers in a plurality of cells for said plurality of time periods to generate average signal strength values for said plurality of cells for said plurality of time periods;
averaging said average signal strength values for said plurality of time periods.

9. The method of claim 8 wherein said process of normalizing said signal strength data further comprises:
averaging said average signal strength value for at least one of the plurality of cells with other average signal strength values for adjacent cells.

10. The method of claim 7 further comprising:
graphically displaying said differential signal strength data to produce a graphical representation of said atmospheric precipitation density.

11. The method of claim 7 further comprising the process of:
identifying locations of high precipitation density cells during each of said plurality of time periods that have a predetermined precipitation density;
calculating velocity and direction of movement of a storm based upon said locations of said high precipitation density cells to predict movement and velocity of said storm for time periods that are subsequent to said plurality of time periods.

12. The method of claim 11 wherein said process of identifying locations of high precipitation density cells further comprises:
identifying a closest cell to a cell of interest of said high precipitation density cells for said storm during each time period of said plurality of time periods.

13. A system for detecting atmospheric precipitation density using signal-to-noise ratio data relating to the signal-to-noise ratio of downstream signals transmitted from a satellite to subscribers at known subscriber locations comprising:
a subscriber transceiver configured to receive said downstream signal and transmit an upstream signal;
a subscriber modem configured to receive said downstream signals from said transceiver, determine said signal-to-noise ratio data of said downstream signal and encode said upstream signal with said signal-to-noise ratio data; and
a control system configured to receive said upstream signal, extract said signal-to-noise ratio data from said upstream signal, normalize said signal-to-noise ratio data by averaging said signal-to-noise ratio data over a plurality of time periods to produce averaged signal-to-noise ratio data, and compare said signal-to-noise ratio data for a current time period with said averaged signal-to-noise ratio data to generate differential signal-to-noise ratio data that is representative of atmospheric precipitation density.

14. The system of claim 13 further comprising:
a display configured to graphically display said differential signal-to-noise ratio data to show said atmospheric precipitation density.

15. The system of claim 14 wherein said display is further configured to graphically display said differential signal-to-noise ratio data in color.

16. The system of claim 13 wherein said control system is further configured to:
identify locations of high precipitation density cells during each of said plurality of time periods that have at least a predetermined precipitation density; and
calculate velocity and direction of movement of a storm based upon said locations of said high precipitation density cells over said plurality of time periods to predict movement and velocity of said storm for time periods that are subsequent to said plurality of time periods.

17. The system of claim 16 wherein said control system is further configured to:
identify a closest cell to a cell of interest of said high precipitation density cells for said storm during each time period of said plurality of time periods.

18. The system of claim 17 wherein said control system is further configured to:
average said signal-to-noise ratio data for the subscribers in a plurality of cells for said plurality of time periods to generate an average signal-to-noise ratio value for at least one of the plurality of cells of said plurality of time periods; and
average said average signal-to-noise ratio values for said plurality of time periods.

19. The system of claim 18 wherein said control system is further configured to:
average said average signal-to-noise ratio value for at least one of the plurality of cell with other average signal strength values for adjacent cells.

20. A system for detecting atmospheric precipitation density using signal strength data relating to the signal strength of downstream signals transmitted from a satellite to subscribers at known subscriber locations comprising:
a subscriber transceiver configured to receive said downstream signal and transmit an upstream signal;
a subscriber modem configured to receive said downstream signals from said transceiver, determine said signal strength data of said downstream signal and encode said upstream signal with said signal strength data; and
a control system configured to receive said upstream signal, extract said signal strength data from said upstream signal, normalize said signal strength data by averaging said signal strength data over a plurality of time periods to produce averaged signal strength data, and compare said signal strength data for a current time period with said averaged signal strength data to generate differential signal strength data that is representative of atmospheric precipitation density.

21. The system of claim 20 further comprising:
a display configured to graphically display said differential signal strength data to show said atmospheric precipitation density.

22. The system of claim 21 wherein said display is further configured to:
graphically display said differential signal strength data in color.

23. The system of claim 22 wherein said control system is further configured to:
identify locations of high precipitation density cells during each of said plurality of time periods that have at least a predetermined precipitation density; and
calculate velocity and direction of movement of a storm based upon said locations of said high precipitation density cells over said plurality of time periods to predict movement and velocity of said storm for time periods that are subsequent to said plurality of time periods.

24. The system of claim 23 wherein said control system is further configured to:

identify a closest cell to a cell of interest of said high precipitation density cells for said storm during each time period of said plurality of time periods.

25. The system of claim 24 wherein said control system is further configured to:
average said signal strength data for all of the subscribers in each cell for said plurality of time periods to generate an average signal strength value for at least one of a plurality of cells for said plurality of time periods; and
average said average signal strength values for said plurality of time periods.

26. The system of claim 25 wherein said control system is further configured to:
average said average signal strength value for at least one of the plurality of cells with other average signal strength values for adjacent cells.

* * * * *